US005245900A

United States Patent [19]

Dojnik

[11] Patent Number: 5,245,900

[45] Date of Patent: Sep. 21, 1993

[54] DIE PRESS UNLOADER

[76] Inventor: Siegfried Dojnik, 695 Elgin Street, Newmarket, Ontario, Canada, L3Y 3B5

[21] Appl. No.: 677,479

[22] Filed: Mar. 29, 1991

[30] Foreign Application Priority Data

Apr. 18, 1990 [CA] Canada .................................. 2014800

[51] Int. Cl.[5] .......................... B26D 7/18; B65G 47/66

[52] U.S. Cl. .......................................... 83/81; 83/160; 83/165; 83/167; 193/2 A; 193/15; 198/747; 198/836.3; 198/861.5; 269/99; 269/228

[58] Field of Search ..................... 83/81, 82, 109, 112, 83/149, 157, 165, 167, 155.1, 158, 160; 193/2 A, 15; 198/747, 836.3, 861.5; 269/99, 228

[56] References Cited

U.S. PATENT DOCUMENTS

| | | | |
|---|---|---|---|
| 755,632 | 3/1904 | Dempcy | 198/747 X |
| 3,734,266 | 5/1973 | Despres | 198/747 X |
| 3,789,711 | 2/1974 | Mead | 83/149 X |
| 3,839,935 | 10/1974 | Daniels | 83/160 X |
| 3,844,405 | 10/1974 | Shuford | 198/836.3 |
| 4,507,995 | 4/1985 | Bredow | 83/157 X |
| 4,706,799 | 11/1987 | Churchland et al. | 83/165 X |
| 4,708,042 | 11/1987 | Jung | 83/165 X |

FOREIGN PATENT DOCUMENTS

| | | | |
|---|---|---|---|
| 0001118 | 1/1984 | Japan | 83/158 |

*Primary Examiner*—Frank T. Yost
*Assistant Examiner*—Raymond D. Woods
*Attorney, Agent, or Firm*—Robert A. Wilkes

[57] ABSTRACT

A die press unloader which retrieves material from beneath the lower die of a pair of dies mounted in a die press. The material which is retrieved will have passed through the lower die, and can comprise either scrap, for example in making perforated strip or product, for example in making shaped blanks from a strip. The unloader utilizes a combination of gravity and a mechanical arm, preferably actuated by a double-acting air cylinder, the movements of which are controlled by the press itself.

9 Claims, 2 Drawing Sheets

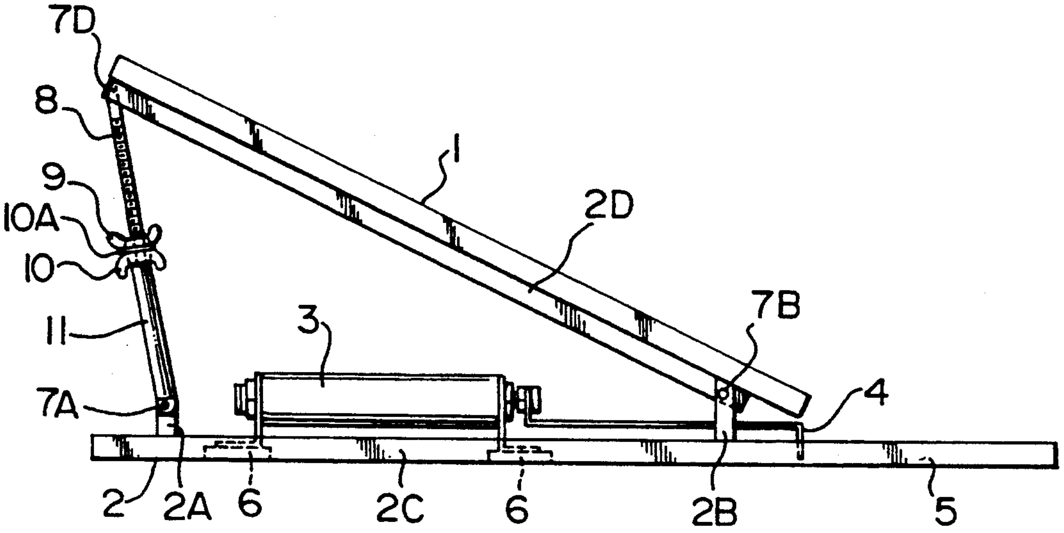
FIG. 3
FIG. 4
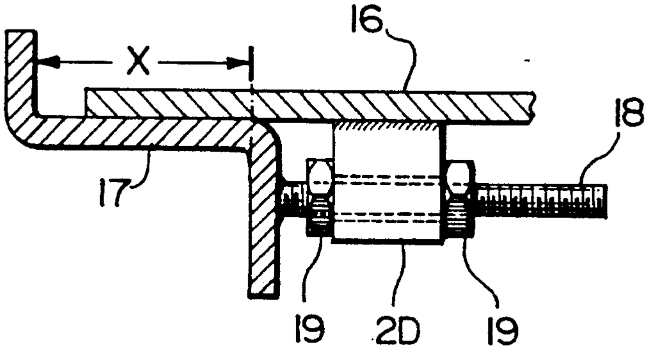
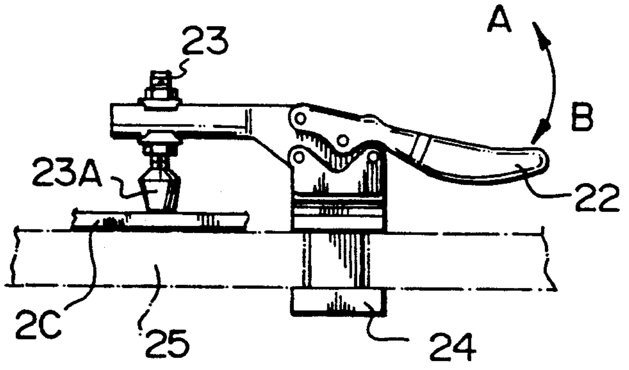
FIG. 5A
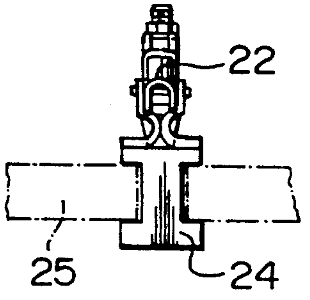
FIG. 5B

DIE PRESS UNLOADER

BACKGROUND OF THE INVENTION

This invention relates to a device for retrieving stamped-out material from beneath the lower die, of a pair, in a situation where the stamped material has passed through the die. The material passing through the die, depending on the nature of the operation, can be either scrap or the desired product.

In various industries similar problems arise, each requiring different solutions. For example Mueller, in U.S. Pat. No. 1,420,567 describes a device for loading and unloading a bakery oven, and Vadas in U.S. Pat No. 3,760,665 describes machinery for peeling and halving pre-cored pineapples.

Turning now to metal handling procedures, Jarman in U.S. Pat. No. 3,866,498, describes a device for retrieving material falling from a metal shearing operation. The device discriminates between product and scrap; a gravity conveyor is used to transfer product into a stacker, which stacks the sheared material into orderly stacks which can be readily moved away from the shears.

Various proposals have also been made in the past to provide devices which retrieve shaped metal products from between a pair of cooperating dies in a die press. Thus O'Leary, in U.S. Pat. No. 2,377,262 describes a work-removing tray for a blanking press. In this press, the shaped product is retained on the upper die by an electromagnet, as the dies are separated. The same press movement causes a tray to be inserted below the upper die; shutting off the magnet deposits the shaped blank into the tray. Further movement of the upper die both reactivates the electromagnet and causes the tray to be retrieved from between the dies.

In a similar way Wallis, in U.S. Pat. No. 3,148,571 describes an adjustable slide for retrieving shaped blanks from between a pair of dies. The slide is actuated by a rack and pinion mechanism driven by the moving die. The slide moves a tray into place below the upper die to receive the shaped blank, and retracts the tray with the blank as the dies begin to close. The shaped blank is removed from the tray for further processing. As described by Wallis this is a complex device, requiring two lost motion arrangements and specially cut gears to ensure that tray movement is coordinated with the position of the press dies, one of which provides the moving power for the slide.

Notwithstanding these more or less complex devices, there is still a need for a simple press slide, which can be adjusted to accept a range of piece sizes, which can readily be attached to a die press, and which will retrieve material stamped out through at least one aperture in the lower one of a pair of cooperating press dies. In some cases the material exiting the die aperture will be scrap, for example round discs punched out in making a perforated strip, whilst in others it will be product, for example round blanks punched out of a length of metal strip. For each case the requirement is the same: the punched out pieces must be removed from below the lower die. This invention seeks to provide such a die press slide, especially for use in a press set up to accept several different die sets using conventional T-slot die parallels to mount the dies. This slide will replace both the vibratory or belt conveyors occasionally used, and the manual use of a push rod by the press operator.

SUMMARY OF THE INVENTION

Thus in its broadest aspect this invention provides a die press unloader, for retrieving material punched out downwardly through at least one aperture in the lower die of a pair of cooperating dies comprising: support means adapted for attachment to a stationary portion of the press adjacent the lower die; a material receiving angled slide tray supported by the support means beneath the lower die apertures at an angle to the horizontal, with its upper end adjacent the die, and which extends laterally from beneath the lower die; a substantially horizontal front pan, supported by the support means adjacent the lower end of the angled slide tray; a ram means adapted to traverse the front pan to move material received thereon away from the lower end of the angled slide tray; actuating means to cause the ram to traverse the front pan; and securing means adapted to secure the support means removably to a stationary portion of the die press.

Preferably, the support means comprises a steel frame, which includes adjusting means whereby the angled slide tray width can be varied to fit the press die aperture width.

Preferably, the support means further includes adjusting means whereby the upper end of the angled slide tray can be moved vertically to accomodate a plurality of different dies.

Preferably, the ram means comprises a pusher of substantially the same width and depth as the front pan.

Preferably, the actuating means includes at least one fluid operated cylinder, the fluid for which is preferably compressed air, and, more preferably, which is caused to operate the ram in response to the operation of the press.

Preferably, the securing means is adapted to secure the support frame onto the same press bed, as is included in the die press to support the lower die. More preferably, the securing means includes a cam-action quick release attachment to the die press bed.

BRIEF DESCRIPTION OF THE DRAWINGS

The invention will now be described in one embodiment by way of reference to the attached drawings in which: FIG. 3, shows a side view of an adjustable slide; FIG. 4, shows an end-view of the width adjustment for the slide;

FIGS. 5A and 5B show two views of a T-slot lever clamp for use with the slide. In these Figures like parts are given the same numbers. Further, the major parts of the die press are omitted from these Figures primarily for clarity. In use, the slide is attached to the same press bed as is used to support the lower die in the press.

DESCRIPTION OF THE PREFERRED EMBODIMENTS

Figure 1:
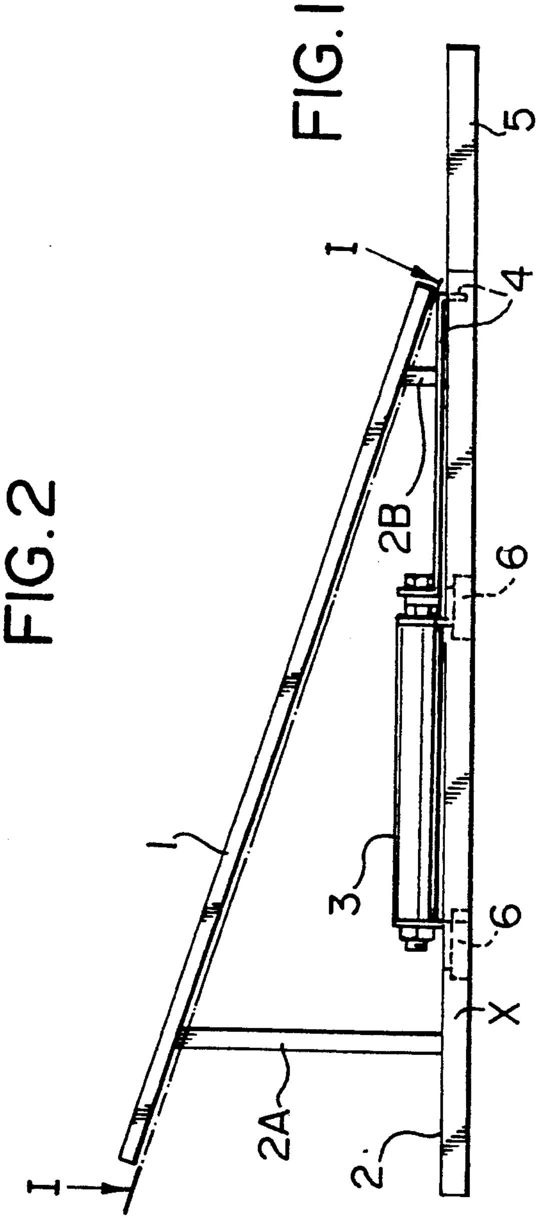
FIG. 1, shows a side view of a slide.

Referring first to FIG. 1, the slide pan, onto which punched-out material is deposited from the die, comprises an inclined plate 1, with (as can be seen in FIG. 4) upstanding edges of a suitable height. If desired, the slide could also be dished along its length to form a chute. The slide is supported by a frame 2, which includes outer members 2C and pairs of upstanding legs 2A and 2B. In the fixed angle construction of FIG. 1, these are preset at the desired length both to give a suitable slope to the slide, and to place the upper end of the slide conveniently close to the underside of the die (not shown).

The side members 2C of the frame are linked by cross members 6, and support a receiving pan 5 having upstanding side walls adjacent the lower end of the slide pan. The cross members 6 also support a double acting cylinder 3 (the piping for this cylinder is omitted) which is attached to a ram or pusher 4. The stroke of the piston in the cylinder 3 is adjusted so that the pusher 4 will traverse the pan and sweep any material off it over the edge 5A, into a suitable receiver (not shown).

This slide thus functions as follows. As the dies close, a metal shape is punched out through the lower die, and falls onto the upper end of the slide, in the vicinity of the longer legs 2A. The shape, which may be either product or scrap as noted above, moves down the slide 1 into the pan 5. Depending on the size of the shape and the capacity of the pan, the cylinder 3 and ram 4 are actuated periodically to empty the pan 5 into a suitable receptacle, which includes a conveyor belt. Conveniently the cylinder 3 is controlled by the press system, and will clear the pan after a preselected number of press strokes. The cylinder can be powered with compressed air, or it can be powered using the pressurized hydraulic fluid system which operates the press. A compressed air cylinder appears to be preferable, mainly because a small air cylinder acts more quickly, generally, than a small hydraulic cylinder. It is preferred that the cylinder be double acting, but a combination of a single acting cylinder and a return spring, which could be mounted inside the cylinder, will also suffice.

Figure 2:
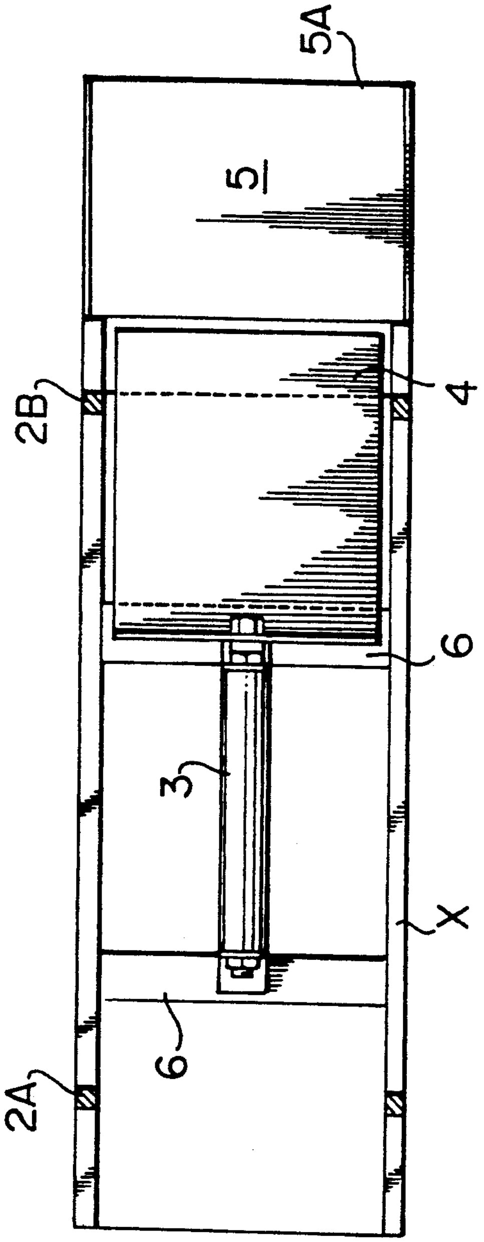
FIG. 2, shows a section view of FIG. 1 on the lines I—I.

The slide shown in FIGS. 1 and 2 would be made to fit a specific press and die combination. In an alternative construction, the slide is adjustable both in height and in width. Referring to FIG. 3, the frame comprises sides 2C, front and rear legs 2B and 2A, and cross members 6, which support the cylinder 3, the ram 4 and the tray 5. The short front legs 2B are attached by the pivot 7B, for example a nut and bolt, to a further supporting frame member 2D, to which the slide 1 is attached. The short rear legs 2A are also attached through similar pivots 7A to adjustable rear legs comprising a threaded member 8, locking nuts 9 and 10 with an antivibration lock washer 10A between them, and a hollow tubular member 11 which receives the lower end of the threaded member 8. The upper end of the threaded member 8 is attached to the upper end of frame member 2D by pivots 7D. The width adjustment device is shown in FIG. 4. It comprises an edge channel 17, which can be moved laterally under the plate 16, comprising the base of the slide pan 1. Attached to the edge 17 are captive bolts 18, which pass through suitable holes in the frame member 2D, and are locked in place by the pair of nuts 19. A suitable number of captive bolt assemblies are provided on each side of the slide 1. Further, several sets can also be made available having different widths, X, for the channel thus providing a wide range of adjustment for the slide.

In most presses, the dies are interchangeable. The lower dies are generally mounted onto the press parallels, which are generally substantial steel parts, utilizing slots formed in the parallels. It is convenient to locate the slide of this invention in the press by attaching it to the same parallels utilizing the slots therein. In FIGS. 5A and 5B two views of a suitable quick-release toggle is shown. It comprises a cam action lever mechanism 22, an adjustable spindle assembly 23, and a T-slot unit 24. In use, with the lever 22 raised to position A, the spindle including a pressure pad 23A is retracted away from the parallels (shown ghosted as 25). The frame 2C is inserted under the pad 23A and the toggle lever 22 closed to the position B, thus actuating the camming action of the toggle to grip the frame 2C between the pad 23A and the top face of the parallel 25. The T-slot nut 24 is sized to allow the toggle clamp to be placed in any required alignment. The spindle 23 is adjusted, by means of the nuts 23B, to give a suitable amount of pressure onto the pad 23A to hold the slide in place under the press. Generally one or two clamps will be used to hold the slide in place.

The embodiments of the invention in which an exclusive property or privilege is claimed are defined as follows:

1. A die press unloader for retrieving downwardly punched-out material comprising: support means attached to a stationary portion of a die press; a material receiving angled slide tray supported by the support means at an angle to the horizontal, and onto an upper end of which the punched-out material is deposited; a substantially horizontal stationary front pan, supported by the support means and spaced a predetermined distance from a lower end of the angled slide tray; a ram means to traverse the front pan, including a pusher of substantially the same width as the front pan, and with a depth substantially equal to the predetermined distance, to move material received thereon away from the lower end of the angled slide tray; actuating means to cause the ram to traverse the front pan; and securing means to secure the support means removably to a stationary portion of the die press.

2. A die press unloader according to claim 1, wherein the support means comprises a frame including at least one edge channel attached to a side of the angled slide tray by an adjusting means, whereby the angled slide tray width is varied.

3. A die press unloader according to claim 1, wherein the support means includes adjusting means whereby the position of the upper end of the angled slide tray is moved vertically.

4. A die press unloader according to claim 1, wherein the actuating means includes at least one fluid operated cylinder.

5. A die press unloader according to claim 4, wherein the operating fluid is compressed air.

6. A die press unloader according to claim 5, wherein the cylinder is activated to move the ram in response to operation of the press.

7. A die press unloader according to claim 4, wherein the at least one cylinder is a double acting cylinder.

8. A die press unloader according to claim 1, wherein the securing means attaches the support means to a die press parallel.

9. A die press unloader according to claim 8, wherein the securing means includes a cam-action quick release attachment.

* * * * *